United States Patent [19]

Lee

[11] Patent Number: 4,638,230

[45] Date of Patent: Jan. 20, 1987

[54] BANG-BANG CONTROLLED VELOCITY COMMAND GENERATOR

[75] Inventor: Patrick S. Lee, Campbell, Calif.

[73] Assignee: Ampex Corporation, Redwood City, Calif.

[21] Appl. No.: 797,173

[22] Filed: Nov. 8, 1985

Related U.S. Application Data

[63] Continuation of Ser. No. 418,508, Sep. 15, 1982.

[51] Int. Cl.⁴ .................................. G05D 23/275
[52] U.S. Cl. .................................. 318/632; 318/569; 318/561; 318/603; 318/616; 360/78
[58] Field of Search .............. 318/561, 632, 569, 567, 318/603, 601, 594, 396, 369, 615–618; 360/78

[56] References Cited

U.S. PATENT DOCUMENTS

| | | | |
|---|---|---|---|
| 3,914,677 | 10/1975 | MacWade | 318/561 |
| 3,917,930 | 11/1975 | Davey | 318/561 |
| 3,958,109 | 5/1976 | Doherty | 318/569 X |
| 4,031,443 | 6/1977 | Droux | 360/78 X |
| 4,168,457 | 9/1979 | Rose | 318/561 |
| 4,314,291 | 2/1982 | Oda | 360/78 X |
| 4,374,349 | 2/1983 | Inaba | 318/561 X |
| 4,423,365 | 12/1983 | Turner | 318/561 |
| 4,459,525 | 7/1984 | Hasegawa | 318/561 |
| 4,469,993 | 9/1984 | Swanson | 318/561 |

*Primary Examiner*—William M. Shoop, Jr.
*Assistant Examiner*—Patrick C. Keane
*Attorney, Agent, or Firm*—Rodney L. Marret; Harry G. Thibault; Joel D. Talcott

[57] ABSTRACT

In a disc information storage system which employs a servo data disc, a servo data head and a moveable carriage assembly for transporting a plurality of magnetic heads radially across the surface of the disc in response to a control signal produced in connection with a velocity command signal, an improved method and apparatus for production of a velocity command signal wherein one or a plurality of discrete velocity steps are added to the velocity command signal in a region which would otherwise indicate only a single value for velocity.

9 Claims, 21 Drawing Figures

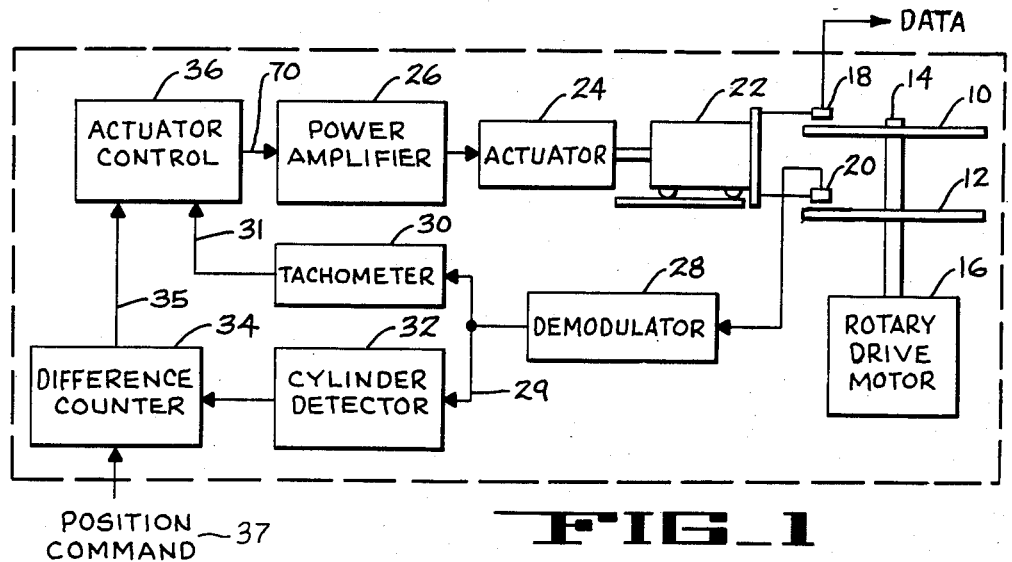
FIG_1
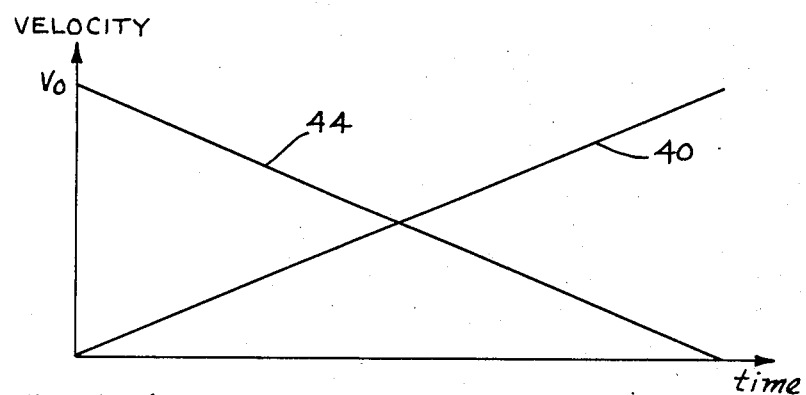
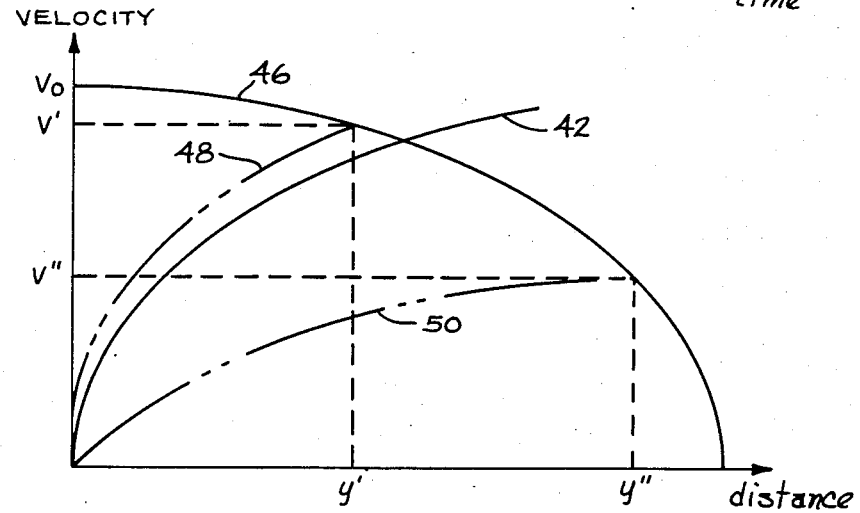
FIG_2

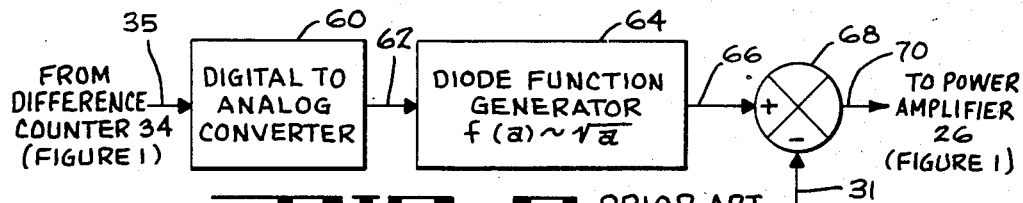
FIG_3 PRIOR ART
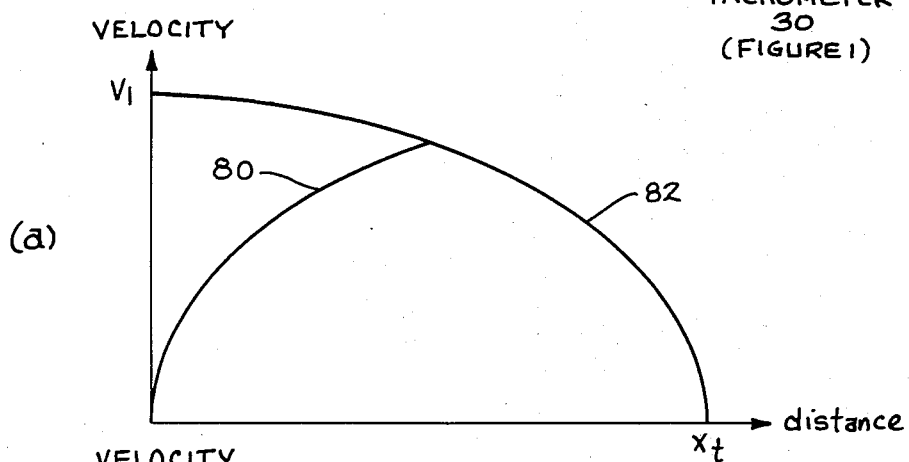
(a)
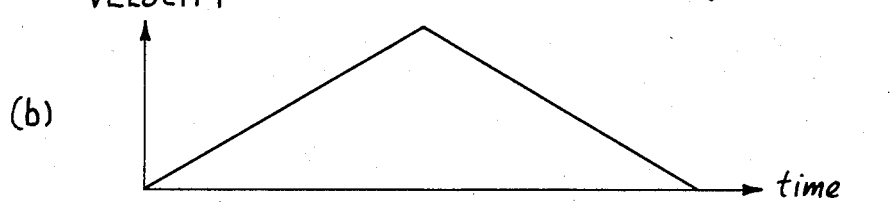
(b)
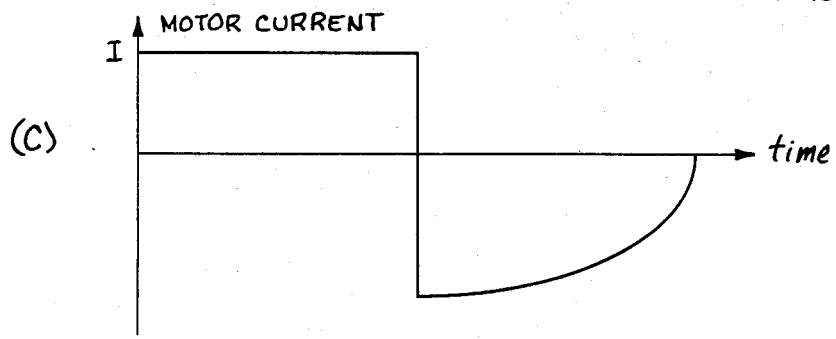
(c)
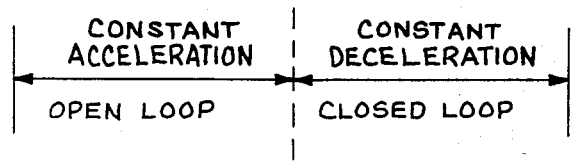
FIG_4

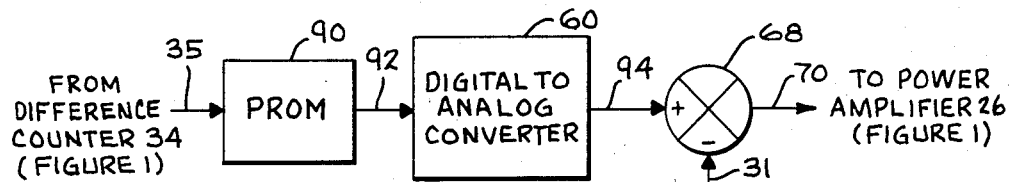
FIG_5 PRIOR ART
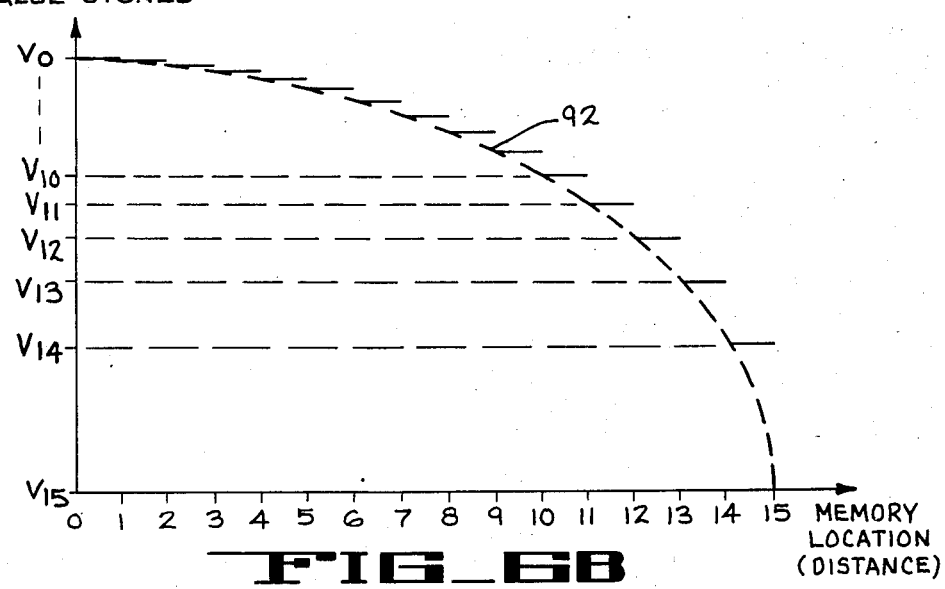
FIG_6A
FIG_6B

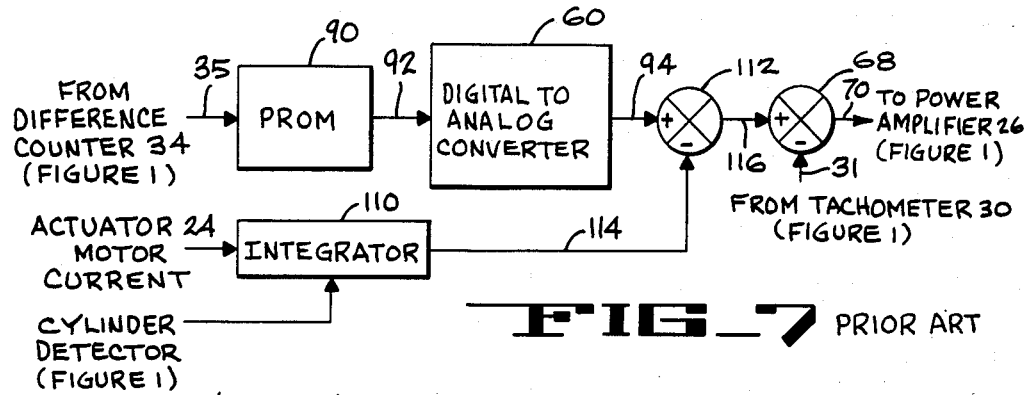
FIG_7 PRIOR ART
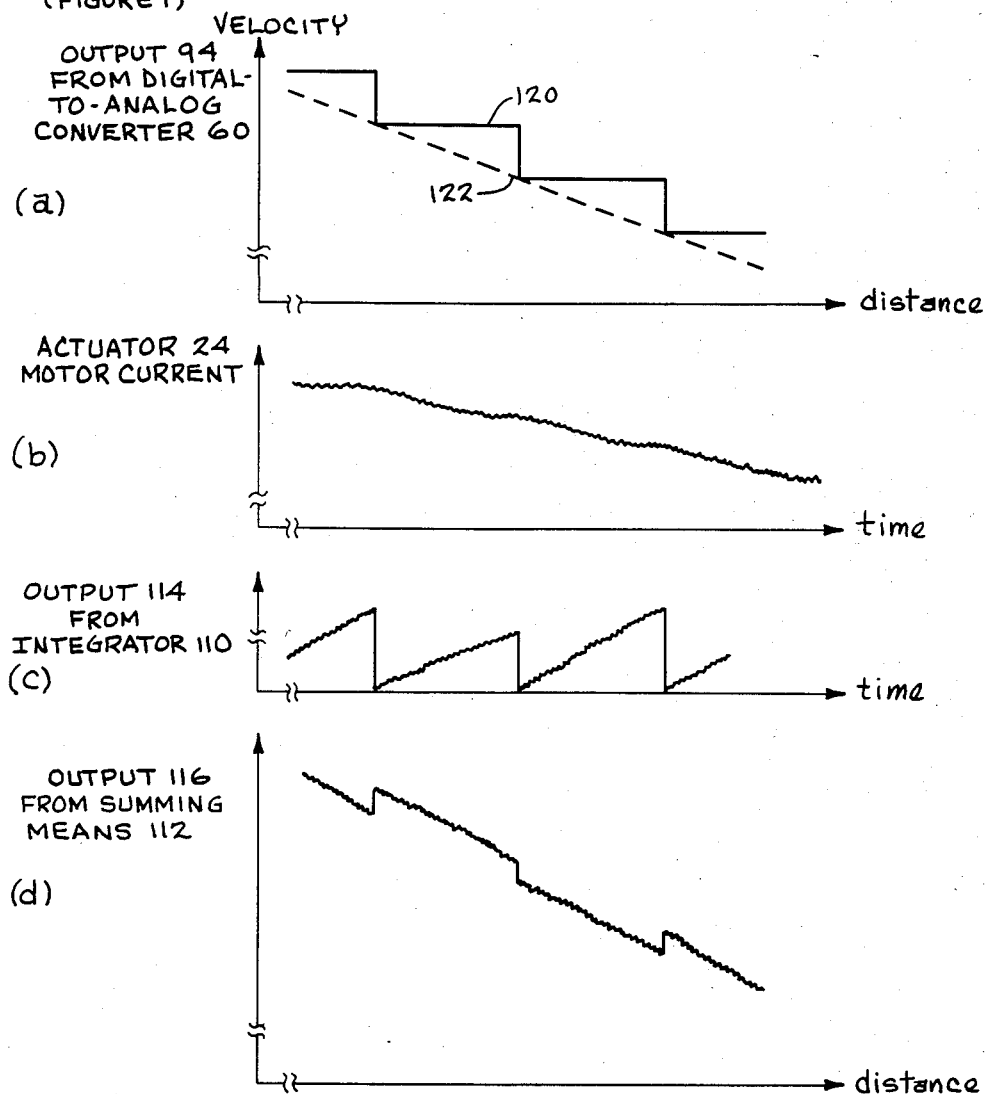
FIG_8 PRIOR ART

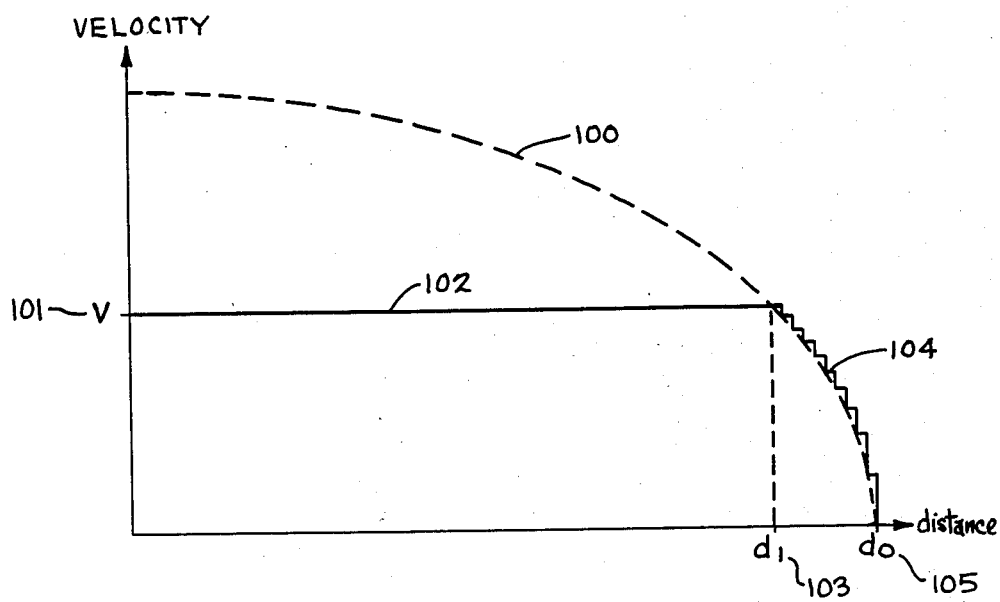
FIG_9 PRIOR ART
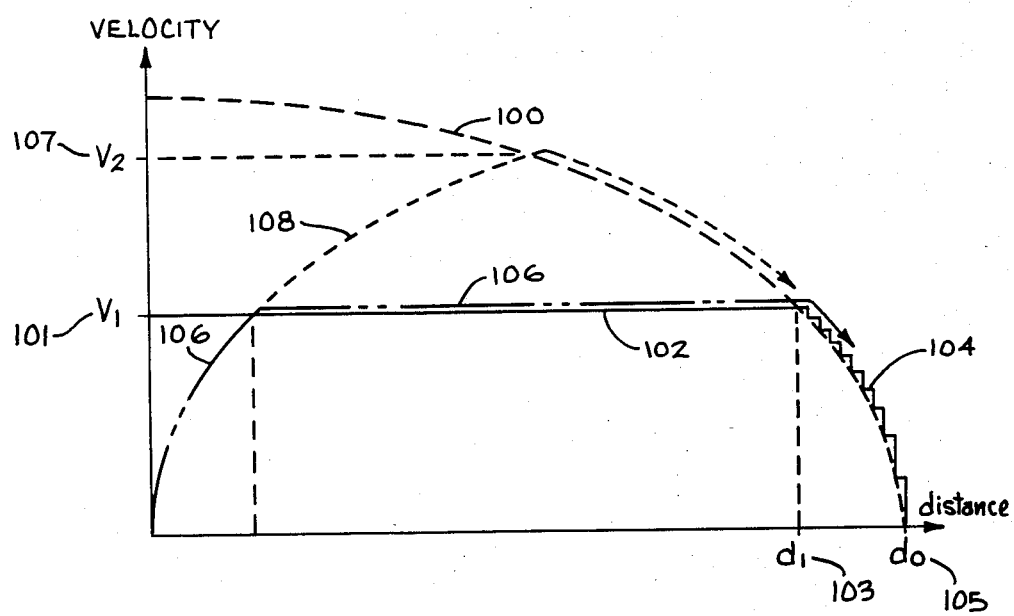
FIG_10 PRIOR ART

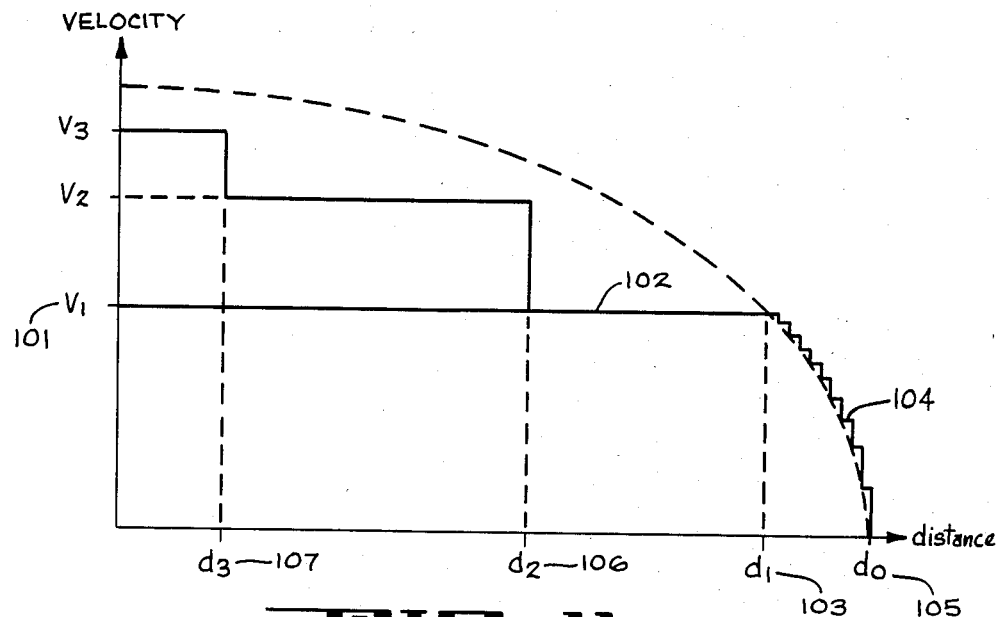
FIG_11
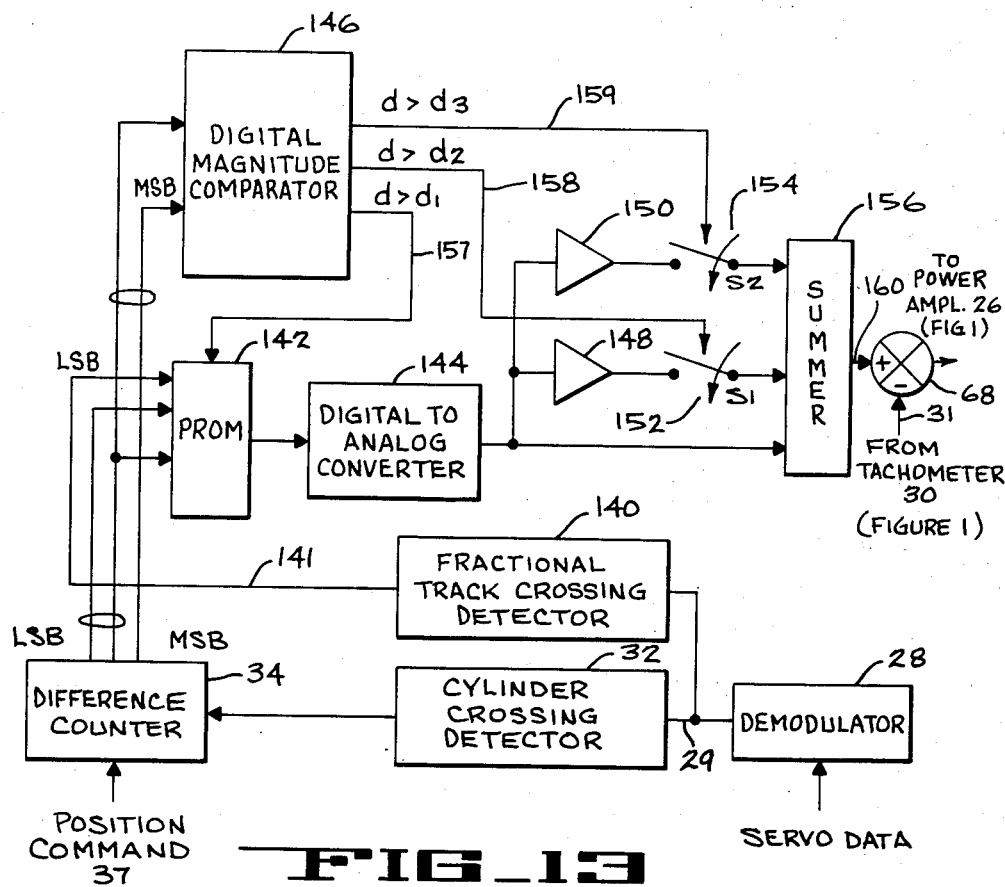
FIG_13

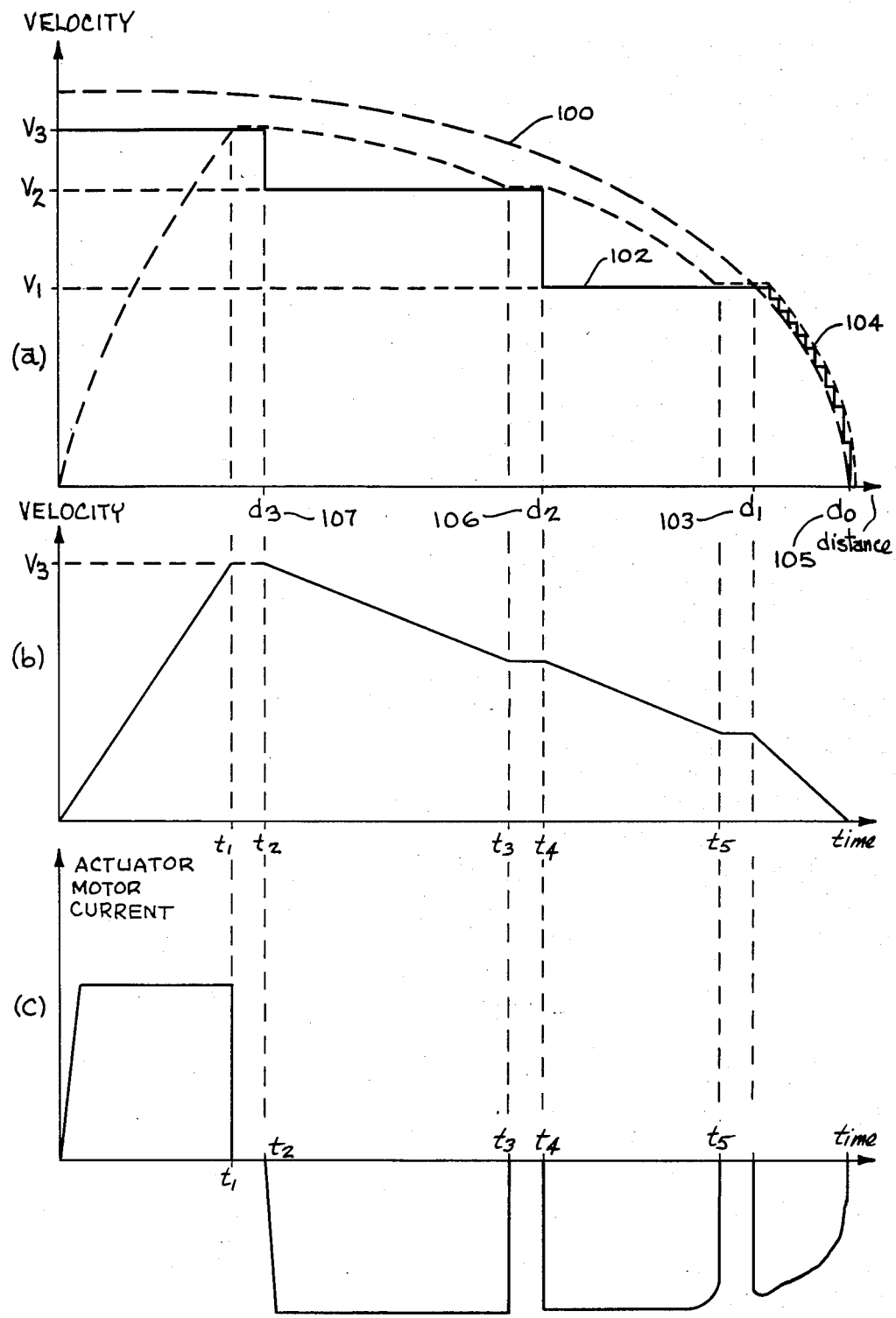
FIG_12

BANG-BANG CONTROLLED VELOCITY COMMAND GENERATOR

This is a continuation of copending application Ser. No. 418,508 filed on Sept. 15, 1982.

BACKGROUND OF THE INVENTION

This invention related generally to magnetic disc data storage devices and more particularly to an improved method for the accurate generation of a velocity command profile for the positioning of transducer apparatus relative to a storage medium.

A disc drive typically comprises a disc pack consisting of a plurality of magnetic discs each having a multiplicity of concentric recording tracks and being mounted on a drive spindle in stacked slightly spaced relation to one another for common rotation about the spindle. The disc drive further comprises an array of magnetic heads disposed in read/write relation with the discs. In the case of moveable head drives, the heads are mounted on an actuator driven carriage mechanism with at least one head operatively associated with each magnetic surface. In such drives the heads are usually moved substantially radially across the discs to access a desired track on any disc.

Information is stored on a surface of a disc by being recorded thereon in a serial format in concentric rings or tracks known in the art as cylinders. The concentric cylinders are arranged across the surface of a disc with varying radii. The density at which cylinders are placed on a disc vary greatly, from sixty tracks per inch to over one thousand tracks per inch, depending upon the parameters of a particular system.

A transducer, or read and write transducer assembly of a moveable head drive cooperates with a particular concentric track on a rotating disk as long as the head retains a selected position. That position of the head is also defined as a particular radial position of the transducer(s) therein, relative to the disc's axis. For a change of tracks, the head has to be displaced radially to that axis so that the transducer(s) may lock on another track. In order to minimize access time to information on any particular track, the head must be moved as rapidly as possible from its present position to the desired position, for cooperation with the desired track. A rapid action displacement of this kind requires the head to be first accelerated as long as possible, and thereafter to be decelerated and stopped directly on the new position. Moreover, it is desirable to have the displacement control operation merged in a tracking operation that maintains the transducer and the head assembly in the desired position.

All disc memories have or are characterized by the minimum, average and maximum access times. Minimum access time is the time for one track seek. Maximum access time is the time needed for travelling the maximum seek length. Average access time is the average time needed for any seek length and is equal to the total accumulated seek time for a large number of seeks divided by the total number of seeks. For simplicity of discussion here, the disc drive is characterized by a "mean access time" instead. Mean access time is the time required by the heads, which read from or write upon the magnetic disc, to move from an outside track on the disc and gain access to a data item contained on the central track. The time is measured from the moment the heads receive an order from the processing system to seek a data item. The central track of the disc has a serial number equal to the mean of the outside track serial numbers. For example, if there are two hundred recording tracks numbered from 0 to 200, then the central track is track 100.

In practice, the mean access time is determined primarily by two factors. One is the average time taken by the disc to complete one revolution. The second is the average time taken by the magnetic heads to move from the outside track to the central track.

Much development work has occurred directed towards reducing mean access time. It is, of course, possible to reduce the average revolution time of a disc by increasing the velocity of rotation. However, the mechanical stresses exerted on the disc severly limit this approach. Thus, the preferred approach is to reduce the average time necessary to move the magnetic head by improving the head control apparatus.

It is to be understood that the primary concern is to reduce the time required to move the magnetic heads from a starting track to a destination track, regardless of starting or destination track. Thus, reduction of mean access time, i.e., where the starting and destination tracks are an outside track and the central track, respectively, is a special case and only illustrative of the general objective.

A majority of head control apparatus includes a "voice coil" electrodynamic motor. The motor has a coil which moves linearly within a permanent magnet, defining a cylindrical core. The coil is mechanically linked to a carriage which carries the magnetic heads. Preferably, the carriage moves along two parallel rails. The coil, carriage and magnetic heads, in combination, define a moveable head assembly.

The current supplied to the voice coil is controlled for obtaining a desired velocity profile of the moveable head assembly. Acceleration and deceleration phases are controlled based upon distance still to be travelled and in relation to the actual velocity in any instant; the moving assembly stops in the desired position with the required degree of accuracy by operation of a velocity command signal that reduces to zero as the object approaches the desired position.

Any object traverses a particular distance in minimum time if it accelerates continuously up to a peak velocity selected so that the immediately succeeding period of deceleration suffices to reduce the velocity to zero. If acceleration and deceleration rates are equal, acceleration and deceleration phases each cover half of the total travel time and half of the total distance to be traversed. In case the acceleration rate differs from the rate of deceleration, the respective phases must vary in proportion. The peak velocity obtained is proportional to the square root of the distance to be traversed (the peak velocity is equal to the square root of distance to be traversed multiplied by the acceleration/deceleration factor, if the two factors are oppositely equal).

These operating conditions are obtained indirectly by the generation of a deceleration velocity command profile to be equal to the square root of twice the deceleration rate multiplied by the distance remaining from a current position to a desired terminal destination, and along which the object is decelerated, while acceleration (or a constant maximum system velocity) prevails up to a velocity distance point on that deceleration curve. Desired and present position of the object (e.g., transducer head) are represented by digital signals, and the difference represents the distance still to be traversed at any instant. A velocity command signal is derived from that difference, to represent the square root of twice the distance yet to be traversed, multiplied by the acceleration/ deceleration factor. A directional command is formed concurrently in dependence upon the sign of the difference. As long as the actual velocity remains below the declining velocity command profile, there is acceleration or a constant maximum system velocity depending upon parameters unique to each system; as the instantaneous value of the velocity command equals the actual velocity, there is changeover to deceleration.

The changeover occurs normally when the object passes the half way mark; at that point the velocity command signal is actually reduced to represent the square root of acceleration multiplied by the distance remaining to be traversed, which is the peak velocity for minimum travel time across the distance remaining to be traversed. If the actual velocity of the object equals that desired peak velocity, deceleration begins. The changeover from acceleration to deceleration occurs earlier if the object actually reaches a higher velocity, the changeover occurs later and at a lower than the theoretical peak velocity if the object fails to reach that latter velocity at the half way point. In other words, the control operation takes care automatically of any deviation from the ideal case.

In case the distance to be traversed is rather large, it may be advisable, however, as a purely precautionary measure, to limit the maximum peak velocity that can be obtained. Such a precautionary measure would result from practical mechanical considerations unique to a particular system. This would correspondingly limit the velocity command profile accordingly so that a period of constant velocity control is interposed between acceleration and deceleration phases.

The actual progression of the moveable head assembly relative to the disc is metered by clocking the progress in units of the digital representation for the distance to be traversed. The digital representation of distance is, in fact, gradually reduced at the rate of that clock, to represent at all times distance still to be traversed. In particular, the velocity command signal is reduced to zero as the object approaches the desired position. The profile and contour of that command signal as a function of the distance from the destination depends upon the deceleration rate and and is the same for all displacements.

With presently known control apparatus, reduction in transit time is achieved by two-stage movement The first stage is an acceleration stage, during which a positive current is applied to the voice coil of the electric motor. The velocity of the moveable head assembly, as a function of time, is substantially linear and increasing. Velocity as a function of the position occupied by the moveable assembly follow a parabolic curve and also increasing.

During the second stage of movement, or the deceleration stage, an opposite current is applied to the voice coil of the electric motor. Velocity as a function of time and position, in this stage, is decreasing linearly and decreasing along the parabolic curve, respectively. At the end of the second stage, the velocity of the movable head assembly is sufficiently low to stop the heads above the selected disc track.

During the first stage, the control apparatus operates under conditions of freedom, frequently referred to as "open-loop" control. Conversely, second stage operation is controlled and the velocity of the moveable assembly is governed to closely approximate a predefined velocity command profile which represents the velocity of the head carriage assembly under conditions of freedom. This controlled mode of operation is frequently referrered to as "closed-loop" control.

Such a control apparatus is a modified "bang-bang" type. The "bang-bang" nomenclature follows from the procedure of applying a first, constant current to the voice coil of the electric motor for an acceleration phase followed by a second constant current of opposite polarity being applied to the voice coil by the electric motor for the deceleration phase. The first acceleration phase is termed the first bang, while the second deceleration phase is termed the second bang. Known existing modified "bang-bang" control apparatus in disc drives only makes use of the first acceleration bang and relies on "closed-loop" control for deceleration phase.

Known and existing control apparatus include an electric motor, means for producing a signal representative of the actual velocity of the moveable head assembly, means for producing a signal representative of a theoretical reference velocity, means for comparing the actual velocity of the moveable head assembly with the theoretical reference velocity and generating a signal in response thereto representing the difference or error between the actual and the theoretical reference velocities, and power means for amplifying the error signal so produced. The electric motor is driven by the amplified error signal.

More particularly, known modified bang-bang control apparatus includes means for applying constant current to the voice coil of the electric motor during the first stage of movement. This is done in an open-loop mode, as there is an absence of feedback in the control system during this stage. During the second state, the control system operates in a closed loop mode, as the amount of current applied to the voice coil of the motor is determined by comparing the actual velocity of the moveable head assembly with a theoretical reference velocity. The theoretical reference velocity is the velocity at which the moveable head assembly would be moving under free conditions.

In the past, the means for producing the signal representative of the theoretical reference velocity was based upon a technique which employed the use of a diode function generator for the production of the necessary square root relationship. Natually this technique was an inexact one, and suffered from numerous shortcomings, all of which resulted ultimately in the inaccurate positioning of the head carriage assembly.

More recently the operation of the diode function generator has been replaced with an approach employing digital techniques. In these digital approaches the desired mathematical square root relationship between velocity and distance is generated based upon numeric values which have been previously stored in a memory device. Consequently, when the desired square root relationship is necessary, it is generated based upon information previously stored.

While such an approach does offer significant advantages over the use of a diode function generator, particularly in stability and accuracy, such a digital approach still has a number of short comings. One of the major short comings relates to the amount of information which can be reasonably stored in the memory device. In practice this become a limitatio spore upon the accuracy of the square root velocity distance relationship which is generated.

In a control system wherein the velocity of a moveable head assembly is controlled by comparing the instantaneous value of velocity against a theoretical desired value, and correcting the actual velocity based upon the amount of error detected, inaccuracies present in the theoretical desired velocity will directly result in errors in the error signal, and ultimately in the resultant velocity of the moveable head assembly.

Current approaches taken to generate the desired square root velocity distance relationship employ the use of a digital memory element which frequently is a programmable read only memory (PROM). In such an approach, each memory location is uniquely specified by a distance value. The distance value represents the remaining distance from a present location of the moveable head assembly to a desired terminal position. In each uniquely specified memory location the corresponding desired velocity for the moveable head assembly is stored. Consequently the values for velocity stored in the PROM represent a collection of discrete numeric values which approximate a continuous mathematical function, i.e., the square root velocity distance relationship.

In such an approach, the resulting accuracy of the implementation of the square root velocity distance relationship is directly dependent upon the number of discrete values used in the approximation process; the larger the number of values used, the more accurate is the resulting approximation. This has a direct effect on the size or number of memory locations required in the PROM. The greater the accuracy desired in the approximation of the square root velocity distance relationship, the larger the number of discrete velocity values required, and the greater will be the number of memory locations required in the PROM. However, practical considerations require limitations on the number of memory locations available in a PROM.

In the process of approximating a continuous mathematical function of a single independent variable by a collection of discrete numeric values, it will be observed that the smaller the changes in the value of the mathematical function for changes in the independent variable, the fewer the number of discrete numeric values required for approximation of the mathematical function. Conversely, the greater the changes in value for the mathematical function for changes in the independent variable, the greater the number of discrete numeric values required for the approximation of the mathematical function.

In the present application wherein the approximation process is applied to a mathematical function having a square root relationship, the resulting values for velocity for given distances will be parabolic about the distance axis. Due to the nature of the mathematical square root relationship between velocity and distance, changes in velocity values will be greatest for distance values as the corresponding values for velocity approach zero.

In present approaches to the implementation of the square root velocity distance relationship which employ a PROM, practical considerations permit only a portion of the velocity command profile to be approximated by storing the associated values in a PROM. This results in a significant reduction in achievable mean access time.

SUMMARY OF THE INVENTION

The present invention provides for improved access time and greater accuracy in the digital synthesis of the mathematical square root velocity distance relationship by providing for the generation of one or a plurality of additional discrete velocity steps for distances whose corresponding velocity values were in prior art defined by a single constant velocity value. In such a design, the digital storage means is restricted to storing the desired mathematical square root velocity distance relation for the terminal portion of the velocity distance curve with the desired accuracy. A single or a plurality of discrete velocity steps are then generated for distances whose corresponding values for velocity are not stored in the PROM.

In operation the distance to be traversed is digitally determined and if it exceeds that stored in the digital storage means, one or a plurality of velocity steps are generated depending upon the distance to be traversed. Consequently by employing such a technique, the digital storage means can be dedicated to the storage of values for velocity corresponding to the desired mathematical square root relationship in significantly increased accuracy for the terminal portion of the velocity-distance curve, without a corresponding reduction in mean access time.

It is therefore an object of the present invention to provide for improvement in mean access time and maximum access time corresponding to the maximum seek length.

It is also an object of the present invention to provide for improvement in mean access time and maximum access time with an increase in the reliability of the resulting accesses.

It is a further object of the present invention to provide improvement in mean access time and maximum access time with an increase in the accuracy of the access.

It is also an object of the present invention in a system wherein digital techniques are employed to generate a desired mathematical relationship, to provide for a more accurate generation of the desired mathematical relationship and concurrently provide for a decrease in mean access time and maximum access time.

BRIEF DESCRIPTION OF THE FIGURES

FIG. 1 is a block diagram of a head carriage position control system for a disc drive.

FIG. 2 illustrates velocity versus time and distance relationship for various constant accelerations.

FIG. 3 illustrates a prior art implementation of a velocity command profile generator using a diode function generator.

FIGS. 4a–c illustrates waveforms associated with the operation of an actuator control.

FIG. 5 illustrates a prior art implementation of a velocity command generator using a PROM.

FIG. 6a illustrates a PROM look-up table.

FIG. 6b illustrates a velocity profile for a command generator implemented by a PROM.

FIG. 7 illustrates a pior art implementation of a velocity command generator employing integration of motor current between velocity steps.

FIGS. 8a–d illustrates various waveforms associated with the operation of the velocity command generator illustrated in FIG. 7.

FIG. 9 illustrates a prior art velocity distance profile for a prior art velocity command generator.

FIG. 10 illustrates diagramatically the operation of an actuator in accordance with a prior art velocity command generator.

FIG. 11 illustrates a velocity distance profile for a velocity command generator incorporating the present invention.

FIGS. 12a–c illustrates waveforms associated with a bang-bang controlled velocity command generator incorporating the present invention.

FIG. 13 illustrates a bang-bang controlled velocity command generator incorporating the present invention.

DETAILED DESCRIPTION

Referring to FIG. 1, a disc drive comprises a pair of magnetically coated recording discs 10 and 12 each having a multiplicity of concentrically disposed data recording tracks and being mounted on a shaft 14 which is driven by a rotary drive motor 16. Magnetic read/write heads 18 and 20 are operatively associated with discs 10 and 12 respectively for the recording or reading data therefrom. As the discs are rotated a moveable head assembly 22 on which the heads are mounted is moved radially across the discs by actuator 24 to position the heads to particular data tracks. Actuator 24 is frequently a voice coil electrodynamic motor, and is energized by power amplifier 26 to move and stop the moveable head assembly in unison at any track on the disc surfaces. Disc 12 has recorded thereon patterns of information in concentric rings which are used exclusively in connection with head 20 and positioning apparatus to accurately position head 18 over a desired cylinder of information, and are referred to in the art as a servo data head and servo data disc. A typical disc drive usually comprises a plurality of data discs (10) and associated heads (18), arranged in a stack on shaft 14 such that corresponding data tracks of all the data discs are disposed one above the other in cylindrical fashion.

In operation of the disc drive, servo data detected by head 20 is applied to demodulator 28. Demodulator 28 produces a waveform which varies from a minimum value to a maximum value as head 20 passes over each of the concentric servo data tracks on disc 12. Consequently the waveform produced by demodulator 28 is representative of linear displacement of the moveable head assembly 22, and is applied to tachometer 30 and cylinder detector 32. Cylinder detector 32 produces a single pulse for each track or cylinder of servo data which head 20 crosses of the servo disc 12 as head carriage 22 moves the heads 18 and 20 radially across the surfaces of discs 10 and 12. The pulses so produced by cylinder detector 32 are supplied to difference counter 34 which keeps track of the location of heads 18 and 20 relative to the cylinders of recorded information on disc 10 and 12 by counting the number of cylinder crossings detected by head 20 as it moves across servo data disc 12.

Difference counter 34 also receives position command 37 from an external control system which indicates the desired cylinder over which head 18 is to be positioned for the recording or playback of information. Difference counter 34 thereafter supplies the necessary signal 35 to an actuator control 36 for the subsequent repositioning of moveable head assembly 22. Actuator control 36 also receives a signal 31 from tachometer 30 which indicates the actual velocity and direction at which moveable head assembly 22 and consequently heads 18 and 20 are currently moving. Based on signals supplied from tachometer 30 and difference counter 34, actuator control 36 generates the necessary command signal for power amplifier 26 to drive actuator 24 to position head 18 over the desired cylinder on disc 10 in the minimum amount of time. This present invention includes an improved method for the implementation of actuator control 36.

Moveable head assembly 22 displacement must be very fast and very accurate. Actuator control 36 is designed so that moveable head assembly 22 traverses the respective distances in minimum time. This is achieved by controlling the voice coil current in the electric motor used to implement actuator 24 to obtain a particular velocity profile.

FIG. 2(a) will aid the understanding of certain well known relations, as they are specifically applied to the present invention. An object accelerated by a constant acceleration, a, increases its velocity, v, in accordance with the relation $v(t) = a \cdot t$, where time, t, is time elapsed since starting from a resting position (curve 40). As the object is accelerated, and after having travelled over a distance, x, its velocity is determined by the relation $v(x) = \sqrt{2ax}$ a parabola 42 as depicted in FIG. 2(b).

An object reduces velocity, from a velocity $V_o$ to zero, by operation of a deceleration factor, $-a$, in accordance with the relation $v(t) = V_o - a \cdot t$ (curve 44), FIG. 2(a). As the object decelerates from a velocity $V_o$ at point x, at a deceleration rate, $-a$, and after having travelled over a distance from the point x to a point $X_o$, its velocity is determined by the relation $v = \sqrt{2a(X_o - x)}$, curve 46 in FIG. 2(b), wherein $X_o$ defines the location where the object comes to rest, x and $X_o$ being measured from an arbitrary point of origin (x=0), for example, where acceleration has begun. If y denotes the distance from the destination point, $y = X_o - x$, the velocity is given by $V(y) = \sqrt{2ay}$. In the following we shall describe the velocity-distance for the acceleration in terms of distance x from the starting point of initially accelerated motion, while the velocity distance relation for deceleration will be described in terms of distance y from the destination point.

It will be significant to remember that as long as an object is decelerated at a rate, $-a$, beginning at a distance y' or a distance y" from the destination and respectively at velocity v' or v", deceleration will progress along curve 46, and the object will come to rest in the same destination position, where deceleration curve 46 intersects the distance axis. Thus, curve 46 teaches that in case the object travels at a particular velocity and can be decelerated at a rate, $-a$, the deceleration must begin when the object has distance y from the desired position is related to the particular velocity by $V(y) = \sqrt{2ay}$.

An object traverses a particular distance $X_o$ in minimum time if it is accelerating for half the time it is in motion and decelerating for the remainder of that period, assuming acceleration and deceleration factors are oppositely equal. After half the total travel time has elapsed, the object passes the half-way mark $X_o/2$. At that point, its velocity is given by $V(x) = \sqrt{2a \, X_o/2} = \sqrt{a X_o} = V_p$, being the peak velocity the objects obtains when accelerating and decelerating at similar rates and for equal periods. In other words, an object that was accelerated along velocity profile curve 42, from x =0 to x =$X_o/2$, will stop at $X_o$ if after that point of intersection of curves 42 and 46 the velocity profile follows curve 46.

Deceleration curve 46 permits generalization, as the object will stop in $X_o$, if deceleration begins anywhere on that curve. Assuming the rate of acceleration happens to be larger than a, a velocity profile such as 48 may result. In order to stop the object in the desired position, deceleration must begin earlier, namely when the object reaches point y' having a velocity equal to v'; where curve 48 intersects curve 46. Analogously, in case the rate of acceleration is lower than a, a velocity profile such as 50 may result, intersecting curve 46 when the object reaches point y" having a velocity v". In either case, the object will stop at $X_o$.

Referring now to FIG. 3, which illustrates a general method whereby actuator control 36 (FIG. 1) may be implemented, the output 35 from difference counter 34 represents, in a digital format the remaining distance between the current location of moveable head assembly 22 and a desired location on the disc. This difference signal is supplied to digital to analog converter 60 which produces an analog signal 62 having an amplitude representative of the remaining linear distance. Analog signal 62 is supplied to diode function generator 64 which produces an analog output signal 66 proportional to the square root of the analog signal 62 supplied as an input thereto. Analog output signal 66 consequently is proportional to the square root of the remaining distance to be traversed by the head assembly. Consequently, for a given distance from a desired terminal location, as represented as the output 35 from difference counter 34, and a given constant rate of deceleration, an analog signal representative of the desired instantaneous velocity of the moveable head assembly is generated which, if followed, will result in the heads being positioned over the desired correct cylinder when the velocity thereof reaches zero. The actual velocity 31 of the moveable head assembly, as reported by tachometer 30 is then subtracted by summing means 68. The resulting error signal 70 represents the desired correction in the actual velocity to bring it into agreement with the desired velocity.

An example of the foregoing will serve to clarify the operation.

FIG. 4 illustrates a family of curves. FIG. 4(a) illustrates the relationship between distance and velocity for a period of constant acceleration (curve 80) and for a period of constant deceleration (curve 82). FIG. 4(b) illustrates the corresponding relationship between velocity and time for the periods of constant acceleration and deceleration. FIG. 4(c) illustrates the corresponding current waveform applied to actuator 24 (FIG. 1) for the corresponding periods of constant acceleration and deceleration.

Referring now to FIG. 4(a), and assuming that a linear distance of $X_t$ exists between the present location of the disc heads from a desired location of information on the disc, this difference would be presented to digital to analog converter 60 (FIG. 3) from difference counter 34. A corresponding analog voltage 62 would be produced by analog to digital converter 60 which, after applied to diode function generator 64, would produce the corresponding desired velocity $v_1$ FIG. 4(a) according to the square root velocity distance relationship. Assuming signal 31 from tachometer 30 initiates from zero, error signal 70 supplied to power amplifier 26 would result in the application of a constant current I (FIG. 4(c)) to actuator 24 (FIG. 1). This in turn would result in the constant acceleration of moveable head assembly 22, and the corresponding linear increase in velocity, as illustrated in FIG. 4(b). As the velocity linearly increases, the corresponding resulting velocity, as a function of distance, would be as generally represented by curve 80 in FIG. 4(a). This process would continue, with the corresponding desired velocities as illustrated by curve 82 for the subsequently decreasing distances as generated by diode function generator 64 in response to a decreasing count 35 from difference counter 34, until the velocity reported from tachometer 30 (FIG. 3) equaled the desired indicated velocity as generated by diode function generator 64, i.e., when curve 80 intersects curve 82 in FIG. 4(a). It should be noted that prior to the occurrence of this event, a constant current has been applied in an open loop fashion to actuator 24.

Subsequent to the intersection of curve 80 with curve 82, however, a closed loop period of constant deceleration ensues. In particular, the current to actuator 24 is reversed in polarity, as indicated in FIG. 4(c) for the period of constant closed loop deceleration, and the corresponding velocity of the heads begins to linearly decrease, as illustrated in FIG. 4(b). However, it should be noted that this occurs in a closed-loop fashion, i.e., in such a manner as to maintain the velocity of moveable head assembly 22 in accordance with that defined by curve 82 in FIG. 4(a). By so doing, the velocity of the moveable head assembly will just reach zero when the heads arrive at the desired location.

Diode function generator 64 (FIG. 3) produced the desired mathematical square root relationship between its input and output by taking advantage of the properties inherent in a diode. Unfortunately the results therefrom were accurate in only a relative way, and with advances in digital techniques, the operation of diode function generator 64 was replaced with a more accurate digital technique involving a Programmable Read Only Memory (PROM) element.

A PROM is a digital memory device wherein the contents thereof may be specified as required for the individual application. As a digital memory device, the input to a PROM is a set of binary signals, the state of which uniquely defines a particular memory location within the PROM. The contents of the memory location so defined can be specified as desired for the intended application of the PROM.

In using a PROM in the generation of the square root relationship between velocity and distance, the distance remaining to be traversed by the heads from a current position to a desired final position, as reported in a digital format by signal 35 from difference counter 34, is used to directly specify individual memory locations, i.e., addresses, within the PROM. For each address so specified, the corresponding memory location within the PROM contains, in a digital format, the desired velocity value according to the square root velocity distance relationship. Consequently there results a direct mapping: for each discrete distance remaining to be traversed by the head carriage assembly between a current position and a desired end position, as represented in a digital format from difference counter 34 and supplied to the PROM as a memory address, the corresponding square root velocity distance relationship value is produced.

FIG. 5 illustrates a typical design approach employing a PROM to replace diode function generator 64. The output 35 from difference counter 34 is supplied directly to PROM 90 for the specifying of unique address locations therein. The contents of the respective memory location of PROM 90 are selected such that for a given input signal 35 from difference counter 34, a mathematical square root relationship is generated in a digital format as an output 92. The output signal 92 is then supplied to digital-to-analog converter 60. The output 94 from digital-to-analog converter 60 then represents the desired instantaneous velocity for the head carriage assembly for a given distance from a terminal location according to the desired square root velocity distance relationship. Summing means 68 thereafter subtracts the current velocity of the heads relative to the discs, as reported as signal 31 from tachometer 30. The resulting error signal 70 represents the amount by which the current velocity must be changed to effect agreement with the desired velocity.

One of the problems inherent in the use of a PROM for the approximation of the desired square root relationship between velocity and distance relates to the accuracy of the signal so produced. This can be best understood with ref to FIG. 6A and 6B.

FIG. 6(A) and 6B) in a tabular form the mapping relation in a PROM between a memory location, i.e., a memory address, and the contents of that address. (For the purpose of this discussion a PROM with sixteen memory locations is used for an example.) FIG. 6(a) illustrates the fact that for each of the sixteen individual and unique memory locations (addresses), a corresponding individual and unique value for velocity is stored therein. In essence, there is a one-to-one mapping of a first number, e.g., the memory address, to a second number, e.g., the value stored therein.

This relationship between memory locations and the contents stored thereon is illustrated in graphic form in FIG. 6(B). In FIG. 6(B), the memory locations, i.e., addresses, are plotted along the horizontal axis, and the corresponding values stored therein are plotted along the vertical axis. While it is clear that any value could be stored in the respective memory location, the values illustrated in FIG. 6(B) are so chosen to approximate a square root relationship 92 between the memory location or address which represents distance remaining to be traversed by the head carriage assembly from a current position to a desired terminal position, and the corresponding content of the respective memory location which represents values for the desired velocity of the head carriage assembly according to the square root velocity distance relationship, for each of the respective distances.

It will be observed that for each memory location or address selected, a unique single value is stored. Collectively, the values stored are a collection of discrete, constant values for velocity.

Referring once again to FIG. 5, it is observed that as the contents of each memory location is converted to a corresponding analog voltage by digital to analog converter 60, the resulting analog value is a constant value. In particular, as a series of distances are supplied to PROM 90, from difference counter 34, a series of discrete analog voltage steps result as a corresponding output from digital to analog converter 60. Assuming that the signal 31 from tachometer 30 will be a continuous one, it is clear that the error signal 70 produced by summing means 68 will be a discontinuous one, i.e., it will have abrupt changes present in its output 70 corresponding to the abrupt changes produced by the discrete differences between successive velocity values.

As the error signal 70 is used to control the motion of the head carriage assembly through power amplifier 26 and actuator 24 (FIG. 1), abrupt changes in the output 70 from summing means 68 will produce abrupt changes in the motion of head carriage assembly 22. This is particulary undesirable as it results in inaccuracies in the positioning of head carraige assembly 22.

A current solution to this problem includes the integration of the current being supplied to motor actuator 24, and the subsequent subtraction of this value from the velocity level dictated by the PROM. This approach is based on the fact the acceleration of actuator 24 is directly proportional to the amount of current flowing in the voice coil of the electric motor used to implement actuator 24. Consequently mathematical integration of the motor current produces a voltage proportional to the resulting velocity of the heads. In this approach, the amount of current flowing through the motor is mathematically integrated by electronic means between each cylinder crossing, and the resulting value subtracted from the constant numerical value generated by the PROM. This approach can best be understood with reference to FIGS. 7 and 8.

Referring first to FIG. 7, the output 35 from difference counter 34 is supplied directly to PROM 90 for the specifying of unique address locations therein. The contents of the respective memory locations of PROM 90 are selected such that for a given input signal 35 from difference counter 34, a mathematical square root relationship is generated in a digital format as an output 92. The output signal 92 is then supplied to digital-to-analog converter 60. The output 94 from digital-to-analog converter 60 then represents the desired instantaneous velocity for the head carriage for a given distance from a terminal location according to the desired square root velocity distance relationship as stored in PROM 90.

Concurrently, the amount of current being supplied to actuator 24 (FIG. 1) is integrated by integrator 110. The integration process is performed between successive cylinder crossings, as integrator 110 is reset by the signal generated by cylinder detector 32 (FIG. 1) upon the crossing of each cylinder on servo data disc 12. The output 114 from integrator 110 is thereafter subtracted by summing means 112 from the analog output 94 from digital-to-analog converter 60. The resulting output 110 from summing means 112 represents the desired velocity for moveable head assembly 22, with the step discontinuities produced by the discrete nature of the output 92 from PROM 90 reduced by the subtraction of the integrated motor current 114. The actual velocity of head assembly 22 is thereafter subtracted from output 116 by summing means 68 to produce the desired error signal 70 to drive power amplifier 26 (FIG. 1).

This process can be better understood with reference to FIG. 8. FIG. 8(a) illustrates a portion of the distance-velocity relationships generated by PROM 90 as curve 120, and the actual desired square root relationship by curve 122. FIG. 8(b) illustrates the corresponding current being supplied to actuator motor 24 (FIG. 1) from power amplifier 26. FIG. 8(c) illustrates the integration of the motor current illustrated in FIG. 8(b), and corresponds to output 114 from integrator 110 in FIG. 7. FIG. 8(d) illustrates the corresponding portion of the velocity command profile, originally illustrated in FIG. 8(a), after the integration of the motor current is subtracted therefrom by summing function 112 (FIG. 7), and represents the output 116 from summing means 112 (FIG. 7).

Referring to FIG. 7, the current distance between a desired terminal position and a current position is supplied to PROM 90. The address specified thereby results in the generation of a corresponding constant level analog voltage by digital-to-analog converter 60, as illustrated by the constant velocity values for discrete groups of distances in FIG. 8(a). The current being supplied to actuator 24 motor (FIG. 1) is illustrated in FIG. 8(b), and is integrated by integrator 110 for each discrete group of distances which in practice correspond to cylinder crossings. As the motor current is relatively constant, the integration thereof by integrator 110 produces an output 114 which approximates a linear ramp, as illustrated in FIG. 8(c). The linear ramp produced by integrator 110 is subtracted by summing means 112 from the constant velocity value produced by digital-to-analog converter 60 in response to a discrete velocity value from PROM 90. Consequently, the step discontinuities present in the velocity command profile are reduced, as illustrated in the velocity command profile illustrated in FIGURE 8(d).

While the above described technique offers an improvement in the resulting velocity command profile, this approach suffers from a number of short comings. In particular, it is found in practice that the motor current provides an unreliable and generally inaccurate source from which to extract the deceleration rate. In addition, the implementation is a rather complex one to achieve in practice.

The problem presented by the discrete nature of velocity values produced by a PROM become more acute as the distance between a present position and a terminal position approach zero, i.e., for values of velocity which approach zero.

In particular, for a given range of distance values, the corresponding error between the velocity value reported by the PROM and the actual correct value according to the desired square root velocity distance relationship increases as the distance to the desired terminal location decreases, with the largest errors occurring at the last step prior to the terminal position. This effect can be observed by noting from FIG. 6(b) the increase in the amount of difference between sequential velocity values for corresponding sequentially increasing distances, as the distances approach the terminal position.

As the value for velocity produced by the PROM is used to compare against the actual measured velocity in the generation of the error signal to control the resulting velocity of the moveable head assembly, large errors between the value for velocity produced by the PROM and the desired square root velocity distance relationship result in errors in the actual velocity of the moveable head assembly, i.e., the moveable head assembly is not moving at the theoretical desired velocity which would result in the moveable head assembly stopping precisely at the desired terminal position. This results in errors in the positioning of the moveable head assembly.

One solution to this problem would be to increase the size of the PROM so that a greater number of velocity values could be stored. However, economic considerations preclude this from being a completely satisfactory solution.

In the past this problem has been addressed by restricting the PROM to the storage of values for velocity for distances close to the terminal position of the square root velocity distance relationship, as errors in this region produce a more direct effect on the ultimate correct positioning of the moveable head assembly. For distances more remote from the terminal position, a constant value for velocity is specified. This approach can be best understood with reference to FIG. 9.

Referring to FIG. 9, the theoretical square root relationship between velocity and distance for a given constant value of deceleration is indicated by curve 100 which appears in a dashed line. Curve 102 and 104 taken together indicate the actual implementation of the velocity command profile currently used in practice. The desired terminal position is indicated by $d_o$ 105. For distances between a current position of the moveable head assembly and $d_o$ 105 less than a specified distance $d_1$ 103, the respective values for velocity are stored in a PROM, and closely approximate the desired square root velocity distance relationship. The particular value of $d_1$ 103 is controlled by the number of memory locations available in the PROM: the larger the number of memory locations, the greater will be the distance between $d_1$ 103 and $d_o$ 105. For distances between a current position of the moveable head assembly and $d_o$ 105 greater than $d_1$ 103, a single constant value for velocity V 101 is specified for the velocity command profile. This results directly from the limitation in the number of memory locations available in the PROM. This limitation has an undesirable effect on the resulting access time for distances of the moveable head assembly greater than $d_1$ 103 from the terminal position $d_o$ 105, as will be more fully understood by referring to FIG. 10.

Referring now to FIG. 10, the desired square root velocity distance relationship is indicated by curve 100 which appears in dashed lines. The velocity command profile currently implemented is illustrated by curves 102 and 104 taken together. Assuming the moveable head assembly is currently located at the maximum distance from the desired terminal position $d_o$ 105, i.e., at the intersection of the velocity and distance axis, curve 106 illustrates the resulting velocity distance trajectory experienced by the moveable head assembly in traversing the distance to the terminal position $d_o$ 105. In particular, the moveable head assembly accelerates in an open loop fashion until it attains velocity $V_1$ 101. However, instead of continuing to accelerate until the velocity of the moveable head assembly reaches $V_2$ 107, i.e., the point of intersection of the open loop velocity distance acceleration profile 108 with the velocity distance deceleration profile 100, velocity command profile 102 terminates the acceleration of the moveable head assembly when the velocity of $V_1$ 101 is attained, and thereafter operates in a closed loop fashion to maintain the velocity of the moveable head assembly at a velocity of $V_1$ 101 until the moveable head assembly reaches distance $d_1$ 103 from the terminal position $d_o$ 105, i.e., when the constant velocity profile 102 intersects the square root velocity distance deceleration profile 100. Thereafter closed loop control of the moveable head assembly continues, but deceleration ensues as dictated by the velocity values stored in the PROM. By limiting the maximum velocity attainable by the moveable head assembly to $V_1$ 101 instead of permitting the velocity to continue to increase to $V_2$ 107, additional time is required for the moveable head assembly to reach the terminal position $d_o$ 105. This results in an increase in access time, and is undesirable. However, this result has previously been necessary due to practical limitations imposed by the maximum number of memory locations avalable in the PROM.

Consequently while a PROM implementation of the square root relationship in a velocity command profile offers superior accuracy to that possible using a diode-function generator, the short comings resulting from the discrete nature of the output signal resulting from such a PROM implementation persist. The only ways which have been previously available to achieve better resolution have been either to increase the size of the PROM, with the attendant increase in cost, or to implement only the terminal portion of the velocity distance curve in increased detail using a PROM, and limiting the velocity command profile to a constant value for the remaining portion of the velocity command profile not implemented in the PROM, detail with the undesirable attendant increase in maximum and mean access times.

With the increase in the number of tracks desired to be stored on a disc, greater accuracy in the velocity command signal is required. Consequently, increasing track densities demands increasing accuracy of the velocity command signal. For a given size PROM, the requirement for increased accuracy of the velocity command signal has been achieved at the expense of maximum and mean access times.

The present invention offers a solution to the above described problem by allowing the PROM to be devoted to the terminal portion of the square root velocity distance curve without the attendant requirement of a significant decrease in maximum and mean access times.

This objective is achieved by the introduction of additional discrete velocity steps in the velocity command profile for distances for which prior art velocity command profiles specified a single value for velocity. This approach can be better understood by reference to FIG. 11.

Referring now to FIG. 11, curve 104 illustrates the portion of the velocity command profile implemented with the use of a PROM for distances of the moveable head assembly to the terminal position less than $d_1$ 103. Curve 102 illustrates the constant velocity value $V_1$ 101 which was previously specified by the velocity command profile for distances of the moveable head assembly from the terminal position $d_o$ 105 greater than distance $d_1$ 103.

A velocity command generator incorporating the present invention would, for distances of the moveable head assembly from the terminal position $d_o$ 105 greater than distance $d_1$ 103, specify one or a plurality of additional discrete velocity steps. This is illustrated in FIG. 11 by the addition of two addition velocity steps whereby a maximum velocity of $V_3$ is specified by the new velocity command profile for distances greater than $d_3$ 107 of the moveable head assembly from the terminal position of $d_o$ 105. For distances of the moveable head assembly from the terminal position $d_o$ 105 between $d_3$ 107 and $d_2$ 106, the new velocity command profile specifies a maximum velocity of $V_2$. For distances of the moveable head assembly from the terminal position $d_o$ 105 between $d_2$ 106 and $d_1$ 103, the new velocity command profile specifies a maximum velocity of the moveable head assembly of $V_1$.

The operation of the velocity command generator employing the present invention can best be understood by reference to FIG. 12. FIG. 12(a) illustrates a velocity command profile of a velocity command generator incorporating the present invention, as well as the resulting velocity distance profile of a moveable head assembly in response thereto. FIG. 12(b) and 12(c) illustrate the corresponding actual velocity versus time and current supplied to actuator 22 versus time waveform respectively.

Assuming the moveable head assembly is initially at a distance corresponding to the intersection of the distance and velocity axis of FIG. 12(a) from a terminal position represented by $d_o$ 105, a positive current is initially applied to actuator 22, as illustrated in FIG. 12(c). As a result of the positive current, the velocity of the moveable head assembly linearly increases as illustrated in FIG. 12(b), up to time $t_1$, i.e., until the velocity of the moveable head assembly reaches velocity $V_3$ at time $t_1$. The moveable head assembly consequently accelerates in an open loop fashion until the velocity of the movable head assembly equals velocity levels $V_3$. As velocity level $V_3$ is the maximum velocity permitted by the velocity command generator (FIG. 12(a)), once velocity $V_3$ is attained by the moveable head assembly, closed loop control ensues thereafter. In particular, after time $t_1$, the actuator motor current is reduced to zero, and the velocity of the moveable head assembly, in this example, remains essentially equal to $V_3$ until the moveable head assembly crosses distance $d_3$ 107 whereupon the velocity command profile specifies a new velocity for the moveable head assembly, i.e., velocity level $V_2$. As the current velocity of the moveable head assembly is greater than velocity $V_2$, a deceleration "bang" is produced by the application of a constant negative current to actuator 22, as illustrated in FIG. 12(c). This constant negative current applied to the actuator results in a linear decrease in the velocity of the moveable head assembly, as illustrated in FIG. 12(b) beginning at time $t_2$. The negative current is supplied to the actuator until the velocity of the moveable head assembly matches that specified by the velocity command profile, i.e., the velocity of the moveable head assembly reaches velocity level $V_2$ at time $t_3$, at which point the actuator motor current is again returned to zero (FIG. 12(c)). This condition continues to exist in this example until the moveable head assembly crosses distance $d_2$ 106 whereupon the velocity command profile specifies a new velocity for the moveable head assembly, i.e., velocity level $V_1$. As the current velocity of the moveable head assembly is greater than velocity $V_1$, a second deceleration "bang" is produced by the application of a constant negative current to actuator 22, as illustrated in FIG. 12(c). This constant negative current results in a linear decrease in the velocity of the moveable head assembly, as illustrated in FIG. 12(b), beginning at time $t_4$. The negative current is supplied to the actuator until the velocity of the moveable head assembly matches that specified by the velocity command profile, i.e., the velocity of the moveable head assembly reaches velocity level $V_1$, at time $t_5$, at which point the actuator current is again returned to zero (FIG. 12(c)). This condition continues to exist until the moveable head assembly crosses distance $d_1$ 103, whereupon the velocity distance profile is specified by values for velocity stored in the PROM as illustrated by curve 104 in FIG. 12(a). Thereafter, deceleration of the moveable head assembly continues in a closed loop fashion until the velocity of the moveable head assembly reaches zero at the position $d_o$ 105.

An implementation of a velocity command generator incorporating the present invention is illustrated in FIG. 13.

Referring to FIG. 13, fractional crossing detector 140, upon receipt of information from demodulator 28, functions to produce an output 141 for each fractional track which is crossed by the moveable head assembly. The number of fractional crossings detected will vary with the particular design of the system incorporating this invention, but in the preferred embodiment was two, i.e., fractional crossing detector 140 would produce an output signal 141 which changes between binary states a multiple number of times for each cylinder track crossed by the moveable head assembly. PROM 142 functions to store values for velocity, and in response to the specification of an address, would produce the corresponding digital word stored therein, i.e., the corresponding value for velocity. Digital to analog converter 144 functions to convert the binary word supplied to the converter 144 to a corresponding analog voltage. Digital magnitude comparator 146 functions to compare the digital number from difIference counter 34 with several predefined numbers, and generates output signals when the number from difference counter 34 is greater than the respective predefined numbers. Gain means 148 and 150 function to provide output signals equal to the input signal multiplied by a predefined amount. Switches $S_1$ and $S_2$ operate in response to signals from digital magnitude comparator 146 to connect the output signal produced by gain means 148 and 150 respectively to the input of summer 156. Summer 156 operates to produce an analog output signal 160 equal to the mathematical sum of the respective inputs thereto. The output from summer 156 would represent a desired velocity command profile, and would be presented as an input to summing means 68. Summing means 68 would function to subtract from the desired velocity command profile the signal 31 from tachometer 30 to produce the error signal 70 for power amplifier 26 (FIG. 1).

A velocity command generator incorporating the present invention as illustrated in FIG. 13 operates in the following manner. In response to signal 29 produced by demodulator 28 from information from the servo data head, cylinder crossing detector 32 produces a single pulse in response to each cylinder which is crossed. Concurrently the output from fractional track crossing detector 140 changes state a number of times, two in the preferred embodiment for half track crossing, in response to each cylinder which is crossed. Difference counter 34, in response to position command 37 and the signal from cylinder crossing detecter 32 produces a digital word representative of the distance between the current position of the moveable head assembly and the desired terminal position. It will be observed that as the output from fractional track crossing detector 140 changes state a number of times for each cylinder which is crossed, the output from fractional crossing detector can be considered as the lower order address bits of PROM 142 (least significant bit for half track crossing in the preferred embodiment) in the digital representation of the distance remaining between the current position of the moveable head assembly and the desired terminal position. Using this approach the higher order address bits of the digital representation of the distance remaining between the current position of the moveable head assembly and the desired terminal position are supplied to the digital magnitude comparator 146. Digital magnitude comparator 146 functions to compare the digital word presented thereto with predefined constants which represent the distance at which a change is desired in the velocity command profile, e.g., $d_3$ 107, $d_2$ 106 and $d_1$ 103 (FIG. 12(a)). The lower order address bits of the digital representation of the distance remaining are supplied as the higher order address inputs to PROM 142.

The operation of the velocity command generator illustrated in FIG. 13 can best be understood by way of example. Assuming that the moveable head assembly currently exist at a position corresponding to the intersection of the distance and velocity axis in FIG. 12(a) from a desired terminal position $d_o$ 105. The desired terminal position will be communicated to the velocity command generator by position command 37. Difference counter 34 will, in response to cylinder crossing pulses generated by cylinder crossing detector 32 produce an output which represents the distance remaining between the current position of the moveable head assembly and the desired terminal position. As the initial distance of the head carriage assembly from the desired terminal position is greater than $d_3$, $d_2$ and $d_1$, (FIG. 12(a)), the corresponding output from digital magnitude comparator 146 will result in switch $S_2$ 154, $S_1$ 152 to be closed, and the output from PROM 142 to be set to the value $V_1$ by signal 157. Consequently the inputs to summer 156 are the output from digital to analog converter 144 which is an analog signal representative of velocity value $V_1$ (FIG. 12(a)), and the outputs from gain means 148 and 150. The gain of gain means 148 is a predefined value which when the value of $V_1$ is supplied as an input thereto, produces an output value corresponding to the difference between $V_2$ and $V_1$, e.g., velocity $V_2-V_1$ (FIG. 12(a)). In similar manner, the gain of gain means 150 is a predefined value which when the value of $V_1$ is supplied as an input thereto, produces an output value equal to the difference between $V_3$ and $V_2$, e.g., $V_3-V_2$, which, when summed with the output of the digital to analog converter 144 and the value produced as an output from gain means 148, produces a output value corresponding to velocity $V_3$ (FIG. 12(b)). Consequently, in the present example with the position of the head carriage assembly at the intersection of the distance and velocity axis in FIG. 12(a), the output from summer 156 will be the sum of the respective inputs thereto, i.e., the output from digital to analog converter 144 and the two gain means 148 and 150, to produce a velocity command profile 160 equal to $V_3$ (FIG. 12(a)). The output 160 from summer 156 is then applied to summing means 68 which, after subtraction of the current velocity of the moveable head assembly, as reported from tachometer 30, produces a control signal 70 to power amplifier 26, in the manner as previously discussed.

When the position of the moveable head assembly relative to the desired terminal position crosses the position indicated by $d_3$ 107 (FIG. 12(a)), signal 159 from digital magnitude comparator 146 will result in switch $S_2$ opening, disconnecting gain means 150 from the corresponding input to summer 156. Thereafter, summer 156 will have as inputs thereto the output from digital to analog converter 144, which due to the fact that the distance of the moveable head assembly for the desired terminal position is still greater than $d_1$ 103, will result in PROM 142 producing a digital value which when applied to digital to analog converter 144 will produce an analog signal equal to velocity $V_1$ (FIG. 12(a)). Likewise, as the distance of the moveable head assembly from the desired terminal position is still greater than $d_2$ 106, signal 158 from digital magnitude comparator 146 will result in switch $S_1$ being closed, thereby connecting gain means 148 as a second input to summer 156. Consequently the analog voltage 160 produced by summer 156 will be a value corresponsing to velocity $V_2$ (FIG. 12(a)).

In a similar fashion, when the position of the moveable head assembly relative to the desired terminal position crosses the position indicated by $d_2$ 106 (FIG. 12(a)), signal 158 from digital magnitude comparator 146 will result in switch $S_1$ opening, disconnecting gain means 148 from the corresponding input to summer 156. Thereafter summer 156 will have as an input thereto the output from digital to analog converter 144 which due to the fact that the distance of the moveable head assembly from the desired terminal position is still greater than $d_1$ 103 will result in PROM 142 producing a digital value which, when applied to digital to analog converter 144 will produce an analog signal equal to velocity level $V_1$ (FIG. 12(i a)).

In a similar fashion, when the position of the moveable head assembly relative to the desired terminal position crosses the position indicated by $d_1$ 103, then signal 157 from digital magnitude comparator 146 will result in PROM 142 supplying the desired values for velocity profile (curve 104, FIG. 11).

While FIG. 13 illustrates one implementation of a velocity command generator incorporating the present invention, it is to be understood that other possible implementations different from the one illustrated in FIG. 13 are possible. For example, the input to gain means 148 and 150 could be supplied directly from a reference voltage rather than from the output of digital to analog converter 144. Likewise, while the above discussion has referenced the implementation of a square root velocity distance relationship, it is clear that any curve of interest could be likewise implemented in a similar fashion. Numerous different implementations are in fact possible without departing from the spirit and scope of the present inventive concept, which is to be limited only by the following claims.

What is claimed is:

1. Apparatus for indicating a desired velocity for a moveable element according to a predefined distance velocity relationship responsive to an existing distance between a desired terminal position and a current position, comprising:

means for generating the existing distance between a desired terminal position and the current position;

comparing means for comparing the existing distance between the desired terminal position and the current position with at least one of a plurality of predefined distances and generating at least one indication of the predefined distances which are exceeded by the existing distance;

first means for producing a single discrete velocity value and a second plurality of selected discrete velocity values when the existing distance exceeds a specified one of said predefined distances, each velocity value of said second values corresponding to a preselected distance which is less than the specified predefined distance and for combining said first and at least one of said second velocity values to generate a value corresponding to the existing distance between the desired terminal position and the current position;

second means for producing a plurality of signals each having a predefined level in response to the indication generated by said comparing means; and summing means responsive to said first single discrete velocity value and to said second plurality of selected velocity values produced by said first means and to at least one of the signals produced by said second means for producing a signal equal to their sum.

2. Apparatus for indicating a desired velocity for a moveable element according to a predefined distance velocity relationship responsive to an existing distance between a desired terminal position and a current position, comprising:

output means for generating the existing distance between a desired terminal position and the current position;

comparing means for comparing the existing distance between the desired terminal position and the current position with at least one of a plurality of predefined distances and generating at least one indication of the predefined distances which are exceeded by the existing distance;

first means for producing a first single discrete velocity value and a second plurality of selected discrete velocity values when the existing distance exceeds a specified one of said predefined distances, each velocity value of said second values corresponding to a preselected distance which is less than the specified predefined distance and for combining said first and at least one of said second velocity values to generate a value corresponding to the existing distance between the desired terminal position and the current position;

second means for producing a plurality of signals each having a predefined level; and third means for selecting the desired velocity by summing the first single discrete velocity value and the second plurality of velocity values produced by said first means and at least one of the signals produced by said second means in response to the indications produced by said comparing means.

3. Apparatus for producing a signal to control the position of a moveable element from a current position to a desired terminal position according to a predefined distance velocity relationship responsive to a desired terminal position indication, a signal representative of the velocity of the moveable element, and a position signal of the moveable element, comprising:

first means for determining the distance from the current position to the desired terminal position responsive to the desired terminal position indication and the position signal;

output means for generating the existing distance between a desired terminal position and the current position;

comparing means for comparing the distance from the current position to the desired terminal position with at least one of a plurality of predefined distances and generating at least one indication of the predefined distances which are exceeded by the existing distance;

second means for producing a first single discrete velocity value and a second plurality of selected discrete velocity values when the existing distance exceeds a specified one of said predefined distances, each velocity value of said second values corresponding to a predefined distance which is less than the specified predefined distance and for combining said first and at least one of said second velocity values to generate a value corresponding to the existing distance between the desired terminal position and the current position;

third means for producing a plurality of signals each having a predefined level fourth means responsive to the indication produced by said comparing means for producing a desired velocity responsive to the sum at least one said first single discrete velocity value and one of said second plurality of velocity values produced by said second means and at least one of the signals produced by said third means; and fifth means responsive to the difference between the desired velocity and the signal representative of the velocity of the moveable element for producing the signal to control the position of the moveable element.

4. Apparatus for producing a signal to control the position of a moveable element from a current position to a desired terminal position according to a predefined distance velocity relationship responsive to a desired terminal position indication, a signal representative of the velocity of the moveable element, and a position signal of the moveable element, comprising:

first means for determining the distance from the current position to the desired terminal position responsive to bhe desired terminal position indication and the position signal;

output means for generating the existing distance between a desired terminal position and the current position;

comparing means for comparing the distance between the current position to the desired terminal position with at least one of a plurality of predefined distances and generating at least one indication of the predefined distances which are exceeded by the existing distance;

second means for producing a first single discrete velocity value and a second plurality of selected discrete velocity values when the existing distance exceeds a specified one of said predefined distances, each velocity of said second values corresponding to a predefined distance which is less than the specified predefined distance and for combining said first and at least one of said second velocity values to generate a value corresponding to the existing distance between the desired terminal position and the current position;

third means for producing a plurality of signals each having a predefined level;

fourth means responsive to the indication produced by said comparing means for producing a desired velocity responsive to the sum of signals produced by second and third means; and, fifth means comparing the desired velocity and the signal representative of the velocity of the moveable element and generating a signal to control the position of the moveable element.

5. Apparatus for producing a signal to control the position of a moveable element according to a predefined distance velocity relationship, responsive to an existing distance between a desired terminal position and a current position, and a signal representative of the velocity of the moveable element, comprising:

output means for generating the existing distance between a desired terminal position and the current position;

comparing means for comparing the existing distance between the desired terminal position and the current position with at least one of a plurality of predefined distances and generating at least one indication of the predefined distances which are exceeded by the existing distance;

first means for producing a first single discrete velocity value and a second plurality of selected discrete velocity values when the existing distance exceeds a specified one of said predefined distances, each velocity value of said second values corresponding to a preselected distance which is less than the specified predefined distance and for combining said first and at least one of said second velocity values of generate a value corresponding to the existing distance between the desired terminal position and the current position;

second means for producing a plurality of signals, each having a unique predefined level;

third means for summing the signals produced by said first and second to produce a desired velocity in response to the indication produced by said comparing means; and, fourth means comparing the indication produced by said third means and the velocity of the moveable element and generating a signal to control the position of the moveable element which is representative of the velocity of the moveable element from the desired velocity produced by said third means.

6. A method for indicating a desired velocity for a moveable element according to a predefined distance velocity relationship responsive to an existing distance between a desired terminal position and a current position, comprising the steps of:

generating a position signal corresponding to the existing distance between a desired terminal position and the current position;

comparing the existing distance between the desired terminal position and the current positon with at least one of a plurality of predefined distances and generating at least one indication of the predefined distance which are exceeded by the existing distance;

producing a first single discrete velocity value and a second plurality of selected velocity values when the existing distance exceeds a specified one of said predefined distances, each velocity value of said second values corresponding to a preselected distance which is less than the specified predefined distance and for combining said first and at least one of said second velocity values to generate a value corresponding to the existing distance between the desired terminal position and the current position;

producing a plurality of signals each having a predefined level in response to the indication generated by said comparing means and summing the produced velocity value and at least one of the signals having a predefined level.

7. A method for indicating a desired velocity for a moveable element according to a predefined distance velocity relationship to an existing distance between a desired terminal position and a current position, comprising the steps of:

generating a position signal corresponding to the exsisting distance between a desired terminal position and the current position;

comparing the existing distance between the desired terminal position and the current position with at least one of a plurality of predefined distances and generating at least one indication of the predefined distances which are exceeded by the existing distance;

producing a first single discrete velocity value and a second plurality of selected discrete velocity values when the existing distance exceeds a specified one of said predefined distances, each velocity value of said second values corresponding to a preselected distance which is less than the specified predefined distance and for combining said first and at least one of said second velocity values to generate a value corresponding to the existing distance between the desired terminal position and the current position;

producing a plurality of signals each having a predefined level; and selecting the indication of the desired velocity by summing the first and second velocity values and at least one of the signals having a predefined level in response to the indication generated by said comparing means.

8. A method for producing a signal to control the position of a moveable element from a current position to a desired terminal position according to a predefined distance velocity relationship responsive to desired terminal position indication, a signal representative of the velocity of the moveable element, and a position signal of the moveable element, comprising the steps of:

determining the distance of the moveable element from the current position to the desired terminal position responsive to the desired terminal position indication and the position signal;

generating a position signal corresponding to the existing distance between a desired terminal position and the current position;

comapring the distance of the moveable element from the current position to the desired terminal position with at least one of a plurality of predefined distances and generating at least one indication of the predefined distances which are exceeded by the existing distance;

producing a first single discrete velocity value and a second plurality of selected discrete velocity values when the existing distance exceeds a specified one of said predefined distances, each velocity value of said second values corresponding to a predefined distance which is less than the specified predefined distance and for combining said first and at least one of said second velocity values to generate a value corresponding to the existing distance between the desired terminal position and the current position;

producing a plurality of signals, each having a predefined level selecting in response to the indication produced by said comparing a desired velocity by summing the Produced first and second velocity values corresponding to selected distances within a predetermined range of distances and at least one of the plurality of signals having a predefined level;

generating a signal representative of the velocity of the moveable element, and subtracting the signal representative of the velocity of the moveable element from the desired velocity.

9. A method for producing a signal to control the position of a moveable element according to a predefined distance velocity relationship responsive to an existing distance between a desired terminal position and current position and signal representative of the velocity of the moveable element, comprising the steps of:

generating a position signal corresponding to the existing distance between a desired terminal position and the current position;

comparing the existing distance between the desired terminal position and the current position with at least one of a plurality of predefined distances and generating an indication of the predefined distances which are exceeded by the existing distance;

producing a first single discrete velocity value and a second plurality of selected discrete velocity values when the existing distance exceeds a specified one of said predefined distances, each velocity value of said second values corresponding to a preselected distance which is less than the specified predefined distance and for combining said first and at least one of said second velocity values to generate a value corresponding to the existing distance between the desired terminal position and the current position;

producing a plurality of signals each having a predefined level;

selecting an indication of a desired velocity by summing the first and second velocity values and at least one of said plurality of signals having a predefined level in response to the indications produced by said comparing means;

generating the existing distance between a desired terminal position and the current position; and subtracting the signal representative of the velocity of the moveable element from the desired velocity to produce the signal to control the position of the moveable element.

* * * * *

UNITED STATES PATENT AND TRADEMARK OFFICE
CERTIFICATE OF CORRECTION

PATENT NO. : 4,638,230

DATED : January 20, 1987

INVENTOR(S) : Patrick S. Lee

It is certified that error appears in the above-identified patent and that said Letters Patent is hereby corrected as shown below:

```
Col.  2, line 15, change "severly" to --severely--;
Col.  4, line 49, change "Natually" to --Naturally--;
Col.  4, line 68, change "limitatio spore" to --limitation--;
Col.  6, line 56, change "FIGS. 4a-c" to --FIG. 4--;
Col.  6, line 61, after "a" (second occurrence) insert
                  --velocity--;
Col.  6, line 63, change "pior" to --prior--;
Col.  6, line 66, change "FIGS. 8a-d" to --FIG. 8--;
Col.  7, line  9, change "FIGS. 12a-c" to --FIG. 12--;
Col.  8, line 25, insert a --,-- (comma) before "a parabola";
Col. 11, lines 23 and 24, delete "FIG. 6(A) and 6B)" and
                  insert --FIG. 6(A) illustrates--;
Col. 17, line 19, change "DifIference" to --difference--;
Col. 19, line 19, change "(FIG. 12(ia)) to --(FIG. 12(a))--;
Col. 21, line 26, change "bhe" to --the--;
Col. 23, line 36, change "comapring" to --comparing--;
Col. 24, line  5, change "Produced" to --produced--.
```

Signed and Sealed this

Eighteenth Day of August, 1987

Attest:

DONALD J. QUIGG

Attesting Officer        Commissioner of Patents and Trademarks